(12) United States Patent
Rouanet et al.

(10) Patent No.: US 7,635,411 B2
(45) Date of Patent: Dec. 22, 2009

(54) AEROGEL CONTAINING BLANKET

(75) Inventors: Stephane F. Rouanet, Westford, MA (US); Robert K. Massey, West Newbury, MA (US); Jameel Menashi, Falmouth, MA (US)

(73) Assignee: Cabot Corporation, Boston, MA (US)

( * ) Notice: Subject to any disclaimer, the term of this patent is extended or adjusted under 35 U.S.C. 154(b) by 370 days.

(21) Appl. No.: 11/013,306

(22) Filed: Dec. 15, 2004

(65) Prior Publication Data

US 2006/0125158 A1  Jun. 15, 2006

(51) Int. Cl.
    *C04B 14/04* (2006.01)
(52) U.S. Cl. .................. 106/600; 428/403; 428/407; 252/62
(58) Field of Classification Search .............. 252/62; 428/292.1, 403, 407; 106/600
    See application file for complete search history.

(56) References Cited

U.S. PATENT DOCUMENTS

| | | | |
|---|---|---|---|
| 2,174,770 A | 10/1939 | Wilson ................. 106/18 |
| 2,554,222 A * | 5/1951 | Stross |
| 2,717,214 A * | 9/1955 | Marotta et. al. ........... 106/228 |
| 2,808,338 A | 10/1957 | Bruno et al. ............. 106/69 |
| 2,960,467 A * | 11/1960 | Martinek et al. |
| 3,869,334 A | 3/1975 | Hughes et al. ............ 161/87 |
| 3,935,347 A * | 1/1976 | Blackwell |
| 3,962,014 A | 6/1976 | Hughes et al. ........... 156/276 |
| 4,083,913 A | 4/1978 | Marshall ............... 264/121 |
| 4,221,672 A | 9/1980 | McWilliams ............ 252/62 |
| 4,237,180 A | 12/1980 | Jaskowski .............. 428/280 |
| 4,265,704 A | 5/1981 | Nahta .................. 162/156 |
| 4,495,119 A | 1/1985 | Chung ................. 264/37 |
| 4,751,251 A * | 6/1988 | Thornsberry ........... 521/112 |
| 4,798,679 A * | 1/1989 | Castro et al. |
| 5,090,981 A | 2/1992 | Rusek, Jr. .............. 65/4.4 |
| 5,124,364 A | 6/1992 | Wolff et al. ............ 521/55 |
| 5,137,927 A | 8/1992 | Wolff et al. ............ 521/54 |
| 5,294,480 A | 3/1994 | Mielke et al. ........... 428/240 |
| 5,302,444 A | 4/1994 | Jackson et al. .......... 428/228 |
| 5,306,555 A | 4/1994 | Ramamurthi et al. ..... 428/289 |
| 5,422,055 A | 6/1995 | Yalvac et al. ........... 264/86 |
| 5,569,513 A | 10/1996 | Fidler et al. ........... 428/35.6 |
| 5,605,957 A * | 2/1997 | Yoshida |
| 5,731,360 A | 3/1998 | Pekala et al. ........... 521/54 |
| 5,786,059 A | 7/1998 | Frank et al. ............ 442/68 |
| 5,789,075 A | 8/1998 | Frank et al. ........... 428/312.6 |
| 5,866,027 A | 2/1999 | Frank et al. ............ 252/62 |
| 5,948,314 A | 9/1999 | Geiss et al. ............. 252/62 |
| 5,973,015 A | 10/1999 | Coronado et al. ........ 521/64 |
| 6,040,375 A | 3/2000 | Behme et al. .......... 524/492 |
| 6,080,475 A | 6/2000 | Frank et al. ........... 428/331 |
| 6,083,619 A | 7/2000 | Frank et al. ........... 428/331 |
| 6,087,407 A | 7/2000 | Coronado et al. ........ 521/64 |
| 6,121,336 A * | 9/2000 | Okaorafor et al. ........ 521/112 |
| 6,143,400 A | 11/2000 | Schwertfeger et al. ... 428/304.4 |
| 6,217,691 B1 | 4/2001 | Vair, Jr. et al. ......... 156/176 |
| 6,274,647 B1 | 8/2001 | Knight et al. .......... 523/179 |
| 6,316,092 B1 | 11/2001 | Frank et al. ........... 428/312.6 |
| 6,444,715 B1 | 9/2002 | Mukherjee et al. ....... 521/64 |
| 6,479,416 B1 | 11/2002 | Frank et al. ........... 442/417 |
| 6,492,014 B1 | 12/2002 | Rolison et al. ......... 428/317.9 |
| 6,598,358 B1 | 7/2003 | Schwertfeger et al. .... 52/145 |
| 6,613,255 B2 | 9/2003 | DiChiara, Jr. .......... 264/44 |
| 6,627,669 B2 | 9/2003 | Mukherjee et al. ....... 521/64 |
| 6,723,378 B2 | 4/2004 | Hrubesh et al. ........ 427/180 |
| 2002/0025427 A1 | 2/2002 | Schwertfeger et al. ..... 428/331 |
| 2002/0094426 A1 | 7/2002 | Stepanian et al. ...... 428/292.1 |
| 2002/0149128 A1 | 10/2002 | DiChiara, Jr. .......... 264/44 |
| 2002/0197396 A1 | 12/2002 | Haggquist ............. 427/180 |
| 2003/0003284 A1 | 1/2003 | Schwertfeger et al. ... 428/292.1 |
| 2003/0077438 A1 | 4/2003 | Frank et al. ........... 428/331 |
| 2003/0082379 A1 | 5/2003 | Hrubesh et al. ........ 428/375 |
| 2003/0148693 A1 | 8/2003 | Erb, Jr. et al. .......... 442/391 |
| 2003/0215640 A1 | 11/2003 | Ackerman et al. ....... 428/405 |
| 2004/0077738 A1* | 4/2004 | Field et al. ............ 521/50 |
| 2004/0142168 A1 | 7/2004 | Hrubesh et al. ........ 428/375 |

FOREIGN PATENT DOCUMENTS

| | | |
|---|---|---|
| DE | 3346180 | 8/1985 |
| DE | 39 42 338 A1 | 6/1991 |
| DE | 42 12 842 A1 | 10/1993 |
| DE | 195 07 732 A1 | 9/1996 |
| EP | 0 340 707 A2 | 11/1989 |
| EP | 0889151 | 1/1999 |
| EP | 0889152 | 1/1999 |
| GB | 655612 | 7/1951 |
| GB | 776398 * | 6/1957 |
| JP | 01157473 | 6/1989 |

(Continued)

OTHER PUBLICATIONS

Answer 88 of 134 Chem Abstracts on STN JP 10152360, Kondo et al. (Jun. 9, 1998) abstract only.*

(Continued)

*Primary Examiner*—Paul Marcantoni

(57) ABSTRACT

A process of producing a blanket is described and can involve forming an aqueous slurry of hydrophobic aerogels, fibers, and at least one wetting agent, drying the aqueous slurry to form a substantially dried product, and calendaring the substantially dried product to form the blanket. The blanket can be used in a variety of applications, including windows.

11 Claims, No Drawings

FOREIGN PATENT DOCUMENTS

| | | |
|---|---|---|
| JP | 01221536 A2 | 9/1989 |
| JP | 04228636 A2 | 8/1992 |
| JP | 08034678 A2 | 2/1996 |
| JP | 10147664 | 6/1998 |
| JP | 10152360 | 6/1998 |
| WO | WO 9807780 | 2/1998 |
| WO | WO 02/052086 A2 | 7/2002 |

OTHER PUBLICATIONS

Answer 87 of 135 Chem Abstracts on STN JP 10147664 Nakayama et al. (Jun. 2, 1998) abstract only.*

Answer 61 of 134 Chem Abstracts on STN "A Study on Absorption of Surfactant Molecules on Magnesium Oxide", Jeevanandam et al. Langmuir (2002), 18(13), p. 5309-5313. Am Chemical Society.*

Anser 56 of 134 of Chemical Abstracts on STN "Redispersion and Reactivity Studies on Surfactant Coated Magnesium Oxide Nanoparticles", Jeevanandam et al. Langmuir (2003), 19(13), 5491-5495. Am Chem Society.*

Pakowski et al., "Measurements and Simulation of Gas Flow Through Composite Aerogel-Glass Fiber Mat," Inzynieria Chemiczna I Procesowa (2001), 22(3D), pp. 1079-1084 (abstract only).

Reim, M. et al., "Highly Insluating Aerogel Glazing for Solar Energy Usage", Solar Energy, 2002, vol. 72, No. 1, pp. 21-29.

International Search Report and Written Opinion from PCT/US2005/045240 issued May 11, 2006.

PCT/US2005/045240 Jun. 19, 2007 International Preliminary Report on Patentability.

PCT/US2006/012971 Oct. 9, 2007 International Preliminary Report on Patentability.

* cited by examiner

AEROGEL CONTAINING BLANKET

BACKGROUND OF THE INVENTION

The present invention relates to a blanket that contains aerogel particles and fibers, a process of making the same, and uses thereof.

Aerogels have a very low density, high porosity, and small pore diameters. Aerogels, in particular those with porosities of greater than about 60% and densities of less than about 0.4 g/cc, exhibit very low thermal conductivity. Therefore, aerogels are used as thermal insulating materials as is described, for example, in EP-A-0 171 722, incorporated in its entirety by reference herein.

However, aerogels can have several disadvantages. For instance, aerogels can have poor mechanical stability, can be dusty, and, when in particulate form, can be prone to settling over time. In addition, aerogels can be brittle, non-flexible, and fracture when compressed. Generally, any attempt to compress or flex large pieces made of aerogel will result in breaking them. Also, transportation, handling, and installation can be difficult with aerogels due to their lack of shock resistance and flexibility.

Accordingly, there is a need for composites that avoid one or more of the above-described disadvantages.

SUMMARY OF THE PRESENT INVENTION

A feature of the present invention is to provide a process of making a blanket or mat that contains aerogel particles and fibers, wherein the blanket preferably has low thermal conductivity, is mechanically stable, and/or is easy to manufacture.

Another feature of the present invention is to provide a method of making a blanket that contains aerogel particles and fibers, wherein the blanket is relatively dust-free.

Another feature of the present invention is to provide a process to intimately mix aerogel particles with water-wetted fibers.

An additional feature of the present invention is to provide a process wherein the hydrophobic aerogel particles preferably restore their low densities after drying.

Additional features and advantages of the present invention will be set forth, in part, in the description that follows, and, in part, will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a blanket that contains aerogel particles and fibers. The process of forming the blanket of the present invention can include (a) forming an aqueous slurry of hydrophobic aerogels, fibers, and at least one wetting agent, (b) dewatering the slurry, and optionally compressing to form a wet web, (c) drying the web, and (d) calendaring the web to form the blanket. The method can also include the step of providing a layer on at least one side of the blanket to form a laminate.

The present invention further relates to aerogel wetted by at least one wetting agent or a slurry containing aerogel and at least one wetting agent.

The present invention, in addition, relates to a panel having at least two glass layers wherein the blanket of the present invention is located between the two glass layers. The overall panel is preferably sealed. In lieu of glass, plastic or other similar materials can be used. The overall panel can be used as a window, wall, floor, and the like.

It is to be understood that both the foregoing general description and the following detailed description are exemplary and explanatory only, and are intended to provide a further explanation of the present invention, as claimed.

All patents, applications, and publications mentioned throughout the application are incorporated in their entirety by reference herein and form a part of the present application.

DETAILED DESCRIPTION OF THE PRESENT INVENTION

The present invention relates to a blanket and to the process of making the blanket. More particularly, the present invention relates to an aerogel containing blanket or mat which overcomes many of the above-described disadvantages and can be utilized in a number of applications involving insulation and the like, including as a material to be located between glass or plastic layers to form an overall panel which is preferably translucent and can be used in a number of applications, such as walls, curtains, floors, windows, and the like. The blanket can be mechanically stable, dust-free, and easy to manufacture, and/or can have a low thermal conductivity for use as an insulative material.

The present invention also relates to a blanket containing aerogel, such as in the form of aerogel particles and fibers. Typically, the blanket is a fibrous matrix which is preferably a non-woven fibrous matrix or fabric which contains or has dispersed therein or amongst the fibers aerogel particles. Typically, the aerogel particles are pre-formed and uniformly dispersed amongst the fibers. Thus, the present invention, in at least one embodiment, relates to a blanket containing at least one wetlaid non-woven layer, wherein the wetlaid non-woven layer contains a uniform mixture of fibers and aerogel, and optionally, a binder.

In the preferred process of making the blanket of the present invention, an aqueous slurry of hydrophobic aerogel particles, fibers, and at least one wetting agent is prepared. Preferably, the hydrophobic aerogel particles, at least temporarily, form an intimate mixture with the fibers. The mixture can then be substantially dewatered, compressed, dried and can be in the form of a web, and, if desired to form a more dense structure, can then be calendared to form a blanket of the present invention. In the present invention, the terms "aerogel particles" and "aerogels" are used interchangeably.

Any aerogel particles can be used in the present invention. The preferred aerogel particles for use in the present invention are those that are based on metal oxides that are suitable for a sol-gel technique (C. J. Brinker, G. W. Scherer, Sol-Gel Science. 1990, Chaps. 2 and 3), such as Si or Al compounds, or those based on organic substances that are suitable for the sol-gel technique, such as melamine-formaldehyde condensates (U.S. Pat. No. 5,086,085) or resorcinol-formaldehyde condensates (U.S. Pat. No. 4,873,218). They can also be based on mixtures of the above-mentioned materials. Preferably, aerogels containing silicon (Si) compounds and, more preferably, $SiO_2$ are used. To reduce the radiative contribution to thermal conductivity, the aerogel can contain IR opacifiers, such as carbon black, titanium dioxide, iron oxide, or zirconium dioxide, or mixtures thereof.

The aerogels can have any particle size that allows them to be dispersed within the slurry. The aerogels can have various particle size distributions. The aerogels can be in the form of comminuted powders or larger chunks. The larger pieces can have a diameter of from about 1 mm to sizes approaching the blanket thickness, and the comminuted aerogels can have an average particle size diameter of 1 mm or less. The large pieces can be in the shape of spheres, although the aerogel chunks can have any shape. Preferably, the particle diameter of the aerogel particles is less than about 0.5 mm and, more preferably, less than about 0.2 mm. A suitable range is 0.01 mm to 1 mm, or 0.05 mm to 0.9 mm.

Essentially, any commercially available hydrophobic aerogel can be used in the present invention. Examples include, but are not limited to, aerogels commercially available from Cabot Corporation. Particular commercially available types include, but are not limited to, Nanogel® aerogels. An advantage of the present invention, and in particular the preferred process used with the present invention, is that the aerogel is pre-formed and therefore any desirable structure, morphology, or other characteristic can be chosen, and this characteristic is essentially present in the final product (e.g., blanket).

The aerogel particles used in the present invention have hydrophobic surface groups. In order to avoid any subsequent collapse of the aerogels by the condensation of moisture within the pores, it is preferred that hydrophobic groups be covalently bonded on at least the inside surface of the aerogel. Preferred groups for permanent hydrophobization are mono-, di-, or tri-substituted silyl groups of the formulas:

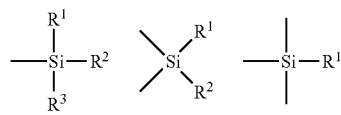

where $R^1$ is hydrogen or a non-reactive linear, branched, cyclic, aromatic, or heteroaromatic organic radical, preferably, a linear, branched, or cyclic $C_1$-$C_{18}$-alkyl radical or a $C_6$-$C_{14}$-aryl radical. $R^2$ and $R^3$, which can be the same or different, can be hydrogen or a non-reactive linear, branched, cyclic, aromatic, or heteroaromatic organic radical, preferably, a linear, branched, or cyclic $C_1$-$C_{18}$-alkyl radical, a $C_6$-$C_{14}$-aryl radical, an OH or OR' group, wherein R' is a linear or branched $C_1$-$C_6$-alkyl radical; preferably trialkyl and/or triarylsilyl groups.

More preferably, $R^1$, $R^2$, and $R^3$, which can be the same or different, are $C_1$-$C_6$-alkyl, cyclohexyl, or phenyl.

The use of trimethyl- and dimethylsilyl groups for permanent hydrophobization of the aerogel can be particularly advantageous. These groups can be introduced as described in WO 94/25149 (incorporated in its entirety by reference herein) or by gas-phase reaction between the aerogel and, for example, an activated trialkylsilane derivative, such as a chlorotrialkylsilane or a hexaalkyldisilazane (cf. R. Iler, The Chemistry of Silica, Wiley & Sons, 1979).

Furthermore and within certain limits, the thermal conductivity of the aerogels can decrease as porosity increases and density decreases. For this reason, aerogels with porosities of greater than about 60% and densities of less than about 0.4 g/cc are preferred. More preferably, the aerogels of the present invention have densities of from about 0.05 to about 0.15 g/cc. The thermal conductivity of the aerogel particles can be less than about 40 mW/m° K, preferably, less than about 25 mW/m° K, and, more preferably, the thermal conductivity of the aerogel particles is from about 12 to about 18 mW/m° K, or lower.

As stated above, the aerogel particles of the present invention are hydrophobic and/or have hydrophobic surface groups. However, hydrophobic aerogel particles cannot be wetted by water. In general, when hydrophobic aerogel particles are added to water they simply float on the surface, even under vigorous agitation. In order to achieve a homogeneous distribution of the hydrophobic aerogel particles and fibers in an aqueous slurry, at least one wetting agent, such as at least one surface active agent (e.g., surfactant), and/or at least one dispersant can be used to more easily permit the wetting of the hydrophobic aerogel particles with water. The dispersant may be selected from ionic (anionic and cationic) surfactants, amphoteric surfactants, nonionic surfactants, high molecular surfactants, and high molecular compounds, for example. The anionic surfactants include alkyl sulfates and higher alkyl ether sulfates, more specifically, ammonium lauryl sulfate, and sodium polyoxyethylene lauryl ether sulfate, for example. The cationic surfactants include aliphatic ammonium salts and amine salts, more specifically, alkyl trimethylammonium, and polyoxyethylene alkyl amine, for example. The amphoteric surfactants may be of betain type, such as alkyl dimethyl betain, or of oxido type, such as alkyl dimethyl amine oxido, for example.

The nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others. A homogeneous distribution of the hydrophobic aerogel particles and fibers can provide the composite material with an almost uniform thermal conductivity.

Typical wetting agents that can be used include, for example, AEROSOL OT (sodium di-2-ethylhexylsulfosuccinite), BARLOX 12i (a branched alkyldimethylamine oxide), TRITON 100 (octylphenoxypolyethoxy(9-10)ethanol), TWEEN surfactants like TWEEN 100 surfactant, and BASF pluronic surfactants. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof. The preferred wetting agent is capable of volatilizing during the drying and/or hot calendaring to allow suitable recovery of the hydrophobicity of the hydrophobic aerogel particles. If the wetting agent remains on the surface of the aerogel particles, the remaining wetting agent can contribute to the overall thermal conductivity of the composite material. Thus, the preferred wetting agent is one that is removeable, such as by volatilization with or without decomposition or other means. Generally, any wetting agent that is compatible with the aerogel can be used.

In general, hydrophobic aerogel particles can include a large surface area, such as, for example, about 700 $m^2$/g. Accordingly, the amount of surfactant or dispersant that would allow complete wetting of the aerogel may be large. Generally, complete wetting is considered to take place when a sufficient amount of wetting agent has been added to allow the water to penetrate the interior of the aerogel particles so that they sink in the aqueous medium. Typically, the addition of more than about 0.6 to 0.8 parts by wt. wetting agent to about 1 part by wt. aerogel can result in full wetting of the hydrophobic aerogel particles. However, when the aqueous slurry is substantially dried, the fully wetted particles can exhibit a large increase in particle bulk density. As a consequence, the thermal conductivity of the composite material made with fully wetted aerogel particles tends to have higher thermal conductivities.

In order to satisfactorily recover the hydrophobicity and low density of the hydrophobic aerogel particles, it is preferable to use an amount of wetting agent to only wet the outer surface layers of the hydrophobic aerogel particles. Thus, a sufficient amount of wetting agent can be present to be adsorbed on the outer surface of the aerogels particles. When the outer surface layers of the aerogel particles are only wetted, there may be a negligible increase in the bulk density of the aerogel particles on drying. As a consequence, the hydrophobicity of the hydrophobic aerogel particles is relatively unaffected and the composite material tends to have a low thermal conductivity. Thus, preferably about 0.6 parts by wt. or less wetting agent to about 1 part aerogel by wt. is used. For instance, 0.05 part to about 0.5 parts by wt. wetting agent can be used to about 1 part by wt. aerogel. The wetting agent can be pre-applied to the aerogel, or can be introduced into the slurry preferably prior to, at the same time, or after the aerogel is added.

The amount of wetting agent required to only cause the wetting of the outer surface layers of the aerogel particles can depend on the size of the hydrophobic aerogel particles. In general, particles of smaller size require more wetting agents. Preferably, the wetting agent is in an amount sufficient to allow substantial recovery of the hydrophobicity and low density of the hydrophobic aerogels after drying. More preferably, the wetting agent is in an amount sufficient for the final composite material to have a thermal conductivity of less than about 40 mW/m° K, and, most preferably, to have a thermal conductivity of from about 10 to about 30 mW/m° K, such as from about 12 to about 25 mW/m° K.

Typically, from about 0.1 to about 0.4 parts by wt. wetting agent (added to water or other aqueous solution) to one part of aerogel can provide, after optional vigorous shaking and/or stirring, an aqueous slurry that can be substantially free of floating particles while being stirred. However, upon standing, the slurry can separate into two layers, a bottom aerogel-free aqueous layer and a top layer of surface wetted aerogel particles.

The rate at which the separation takes place can depend on the wetting agent-to-aerogel weight ratio, the aerogel particle size and on the viscosity of the slurry, which, in turn, can depend on its solids content. The higher the solids content the longer the time it takes for the separation process to occur. When a minimum amount of wetting agent is employed and the solids content of an aerogel/fiber slurry approaches about 5 to about 10 wt % solids, the slurry can be sufficiently viscous that the separation process can either be inhibited or take place over many hours. As the amount of wetting agent employed is increased, the rate of separation decreases. Accordingly, fiber/aerogel separation can be minimized by adjusting solids, aerogel particle size and wetting agent levels so that the time of separation is long compared to the dewatering time required to form a dried mixture.

The fibers can be natural fibers, synthetic fibers, or both. The fibrous formation can contain at least one thermoplastic fibrous material with which the aerogel particle can be attached and by which the fibers can be connected to each other in the formation in such a way that the thermoplastic fibers at the surface are fused and, on cooling, result in a joining of the fibers to each other and to the aerogel particles. This thermal consolidation can ensure a stable fibrous formation and that the aerogel particles are firmly held within the fibrous matrix.

A fibrous formation can be any formation that can be produced using a surface-forming technique. Such surface formations can be textile fabrics, random-fiber matting, knitted fabrics, and/or fleeces.

Fleeces can include stable fiber mats, i.e., random-fiber mats of fibers that are of finite length, as well as spun-fiber mats, i.e., those that are of continuous fibers.

Examples of thermoplastic fibers include polyolefin fibers, polyamide fibers, or polyester fibers. Preferred suitable fibers include glass fibers suitable for the wetlaid process, which can be obtained form Lauscha Fiber International, Q fibers, which can be obtained from Johns Manville, polymeric fibers, such as polyethylene fibers, which can be obtained from Mini-Fibers, and short-cut bicomponent fibers, which can be obtained from Invista (formally Kosa). Other types of fibers that can be used in the present invention are, mineral, synthetically made non-carbon fiber, mineral wool, wollastonite, ceramic, cellulose, cotton, polybenzimidazole, polyaramid, acrylic, phenolic, polypropylene, other types of polyolefins, or organic fibers, such as aramid fibers or nylon fibers. The fibers can also be coated, such as polyester fibers metallized with a metal such as aluminum.

In certain embodiments, the fibers that are used in the present invention can be translucent fibers.

Additionally, to provide a blanket having flame-retardant effect, additives of halogen compounds, preferably, bromine compounds or, more preferably, phosphonic compounds, can be condensed into the polyester chain. Most preferably, the flame-retardant modified polyesters are condensed into the chain component group having the formula:

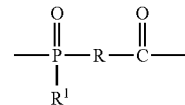

wherein R represents an alkylene or polymethylene having 2 to 6 carbon atoms or phenyl, and $R^1$ represents an alkyl group having 1 to 6 carbon atoms, aryl, or aralkyl. Preferably, in the formula above, R represents ethylene and $R^1$ represents methyl, ethyl, phenyl, or o-, m-, or p-methyl-phenyl, and, more preferably, methyl.

With respect to the fibers in general, the diameter of the fibers that are used in the blanket can be any size. Preferably, the diameter of the fibers is smaller than the mean diameter of the aerogel particles, so that a high proportion of aerogel can be bound into the blanket. The selection of very fine diameter fibers in place of larger diameter fibers makes it possible to produce mats of comparable strength at reduced fiber levels. Preferred fibers are those that have diameters of less than about 20 microns (e.g., from about 1 microns to about 18 microns) and have lengths that are much larger than the particle diameter (e.g., from about 200 microns to about 10,000 microns).

The choice of fiber diameter and/or fiber material can reduce the radiation contribution to the thermal conductivity and can achieve increased mechanical strength.

The individual fiber denier of the fibers can be selected within very wide limits. Preferably, the denier is below about 16 dtex, and, more preferably, below about 6 dtex. Most preferred fibers are the bicomponent fibers of deniers below 4 and cut lengths in excess of 4 mm.

The fibers can have any shape. The fibers can be round, trilobal, pentalobal, octalobal, in the form of strips, or be shaped like fir trees, dumb bells, or otherwise. Hollow fibers can also be used. Additionally, the fiber materials can be smooth or crimped.

The fibers can be modified by conventional additives; for example, anti-static agents such as carbon black. The fibers can also contain IR opacifiers, such as carbon black, titanium dioxide, iron oxide, or zirconium dioxide, as well as mixtures of these, in order to reduce the radiation contribution to thermal conductivity. The fibers may also be dyed to have a color.

The radiation contribution to the thermal conductivity can be further reduced by using blackened fibers, such as polyester fibers blackened with carbon black or simply carbon fibers. Carbon black can also be added to the composition. The mechanical strength of the article obtained after drying can also be influenced by the length and distribution of the fibers in the composition.

In order to reduce the increase in thermal conductivity caused by the added fibers, the proportion (by weight) of the fibers must be held to the smallest amount required to achieve the desired blanket strength. The amount of fiber required depends on its density, diameter, length and, especially, its bonding properties and can be from about 15% to about 70% and, preferably, from about 20% to about 60%. The thermal conductivity of the fiber material can be from about 0.1 to about 1 W/m° K and, preferably, less than about 1 W/m° K.

In one embodiment of the present invention, the present invention relates to a slurry containing aerogel and at least one type of wetting agent with or without fibers. In a further embodiment of the present invention, the present invention relates to an aerogel coated or wetted with at least one wetting agent or dispersant. The aerogel particles can be fully wetted, partially wetted (e.g., surface wetting), or be present in a slurry. The details of the components and amounts are as described above. The slurry or aerogel coated with a wetting agent can be useful as a way to easily introduce hydrophobic aerogel into a variety of materials, such as wet cement, concrete, or other aqueous-containing fluids, slurries, or materials, which can optionally harden to form solid materials. The aerogel wetted with at least one wetting agent or the slurry containing the aerogel with at least one wetting agent permits the easy introduction and uniform distribution of hydrophobic aerogel. The types, amounts, and the like of the aerogel and wetting agent, as described above, apply equally here to these embodiments.

The preferred process for making the composite material of the present invention is an aqueous based nonwoven (e.g., wetlaid) process. The composition can be prepared by mixing the aerogel particles, the fibers, at least one wetting agent and/or any additional additives with the aqueous solution (e.g., water). This mixing can be carried out in any desired manner. Thus, the components can be introduced simultaneously into the mixing apparatus, or sequentially or in any order. Additionally, an aqueous dispersion of a suitable fiber that was previously made can be added to a stirred slurry of the surface-wetted aerogels that was previously made to yield an intimate mixture of the two components. There is also no restriction on the mixing apparatus necessary for the mixing. Any mixing apparatus known for this purpose to a person skilled in the art can be used.

The mixing operation preferably provides distribution of the aerogel particles amongst the fibers present in the composition. The distribution can be uniform. The mixing duration can vary depending on the speed of the stirring device, the size of fibers and aerogel particles, the amount of wetting agent present, and other variables, such as temperature.

To create a relatively dust-free blanket with low thermal conductivity, it is preferable that the proportion by weight of the fibers be as small as possible but sufficient to hold the aerogel. Accordingly, the weight of fiber required can depend on its density, self-bonding characteristics, diameter, length, and the like, and can, typically, be greater than 15%. Preferably, the proportion by weight of the fibers is from about 20% to about 70% by weight. Other amounts can be used. More preferably, for bicomponent fibers the weight of the fibers is about 30%, for glass fibers is about 50% and about 40% for an equal weight mixture of the two. Additionally, the proportion by weight of the aerogels is preferably from about 30% to about 80%. Other amounts can be used.

The slurry can then be dewatered by any known method such as a wire screen, filtering, and the like. To ensure minimal fiber/aerogel separation because of density differences, gentle stirring can be continued during dewatering. Preferably, the slurry is dewatered by filtering on a wire using a wetlaid technique which is known to those skilled in the art. For instance, see U.S. Pat. No. 5,399,422, incorporated in its entirety by reference herein.

The blanket of the present invention can optionally include two or more layers to form a multi-layered or "sandwich" structure, which can include three or more layers. Each layer can have any thickness and/or aerogel-to-fiber weight ratio. The structure can include a relatively thin top and bottom layers having a relatively lower aerogel-to-fiber weight ratio than the intermediate layer, and a relatively thick intermediate layer having a large aerogel-to-fiber weight ratio than the top and bottom layers. Such structures can be readily made using cylinder machines of the type used in making cardboards.

A multi-layered or sandwich structure can be made any way, such as pre-forming each layer and then laminating them together. Or, the layers can be formed in sequence by in situ methods. For instance, a first slurry having a predetermined aerogel-to-fiber weight ratio can be prepared and filtered to form a first layer. A second slurry having a different aerogel-to-fiber weight ratio can then be prepared, introduced, and filtered through the first filtered mixture to form a second layer on the first layer. After the second slurry is at least substantially filtered through the first filtered mixture, a third slurry having the same or different aerogel-to-fiber weight ratio from the first slurry can be prepared and introduced through the first and second filtered mixtures to form a third layer on either the first or second layer side.

The resulting filtered mixture or mixtures can then be pressed to remove water and increase web density, dried at a predetermined temperature and pressure and be calendared at a predetermined temperature and/or pressure to form the blanket of the present invention. The filtered mixture of aerogel particles and fibers can be pressed and dried at a predetermined temperature by any known method and/or instrument. Rotary presses can be used for web dewatering and compression. Drying can be accomplished by steam-heated cylinders or by high velocity air drying or by radiant heat. Preferably, the filtered mixture is dried at a temperature at which the wetting agent volatizes or decomposes so that the hydrophobicity of the hydrophobic aerogel particles is satisfactorily recovered. Additionally, the drying process can also cause some or all of the fibers to bond to one another and/or to the aerogels. Preferably, the filtered mixture is further dried at a temperature of at least about 100° C. and, more preferably, at a temperature of at least about 120° C.

The dried mixture, which can be in the form of a web, can then be, at least partially, further thermally bonded with a hot calendar, preferably a hot calendar roll, to form a strong and relatively dust-free blanket or composite material. The dried mixture/web can also be calendared to a predetermined density at a predetermined temperature and time. Preferably, sufficient temperature and pressure is applied during the calendaring process to form a blanket having a density of from about 0.07 g/cc to about 0.16 g/cc. Depending on the desired density of the blanket, the temperature and time of the hot calendaring can vary.

In the present invention, typically, the blanket containing the fibers and aerogel has significant fiber-fiber contact due to the preferred process of making the blanket containing the aerogel and fibers. In addition, the aerogel that is present in the blanket or distributed throughout the matrix of fibers in the blanket substantially maintains its shape and other morphology characteristics. In other words, using the preferred process of the present invention, one can start with an aerogel of known structure, of known morphology, and other properties, and substantially maintain these properties once present in the blanket containing the aerogel and fibers. This is different from forming the aerogel in-situ with the fibers, thus not being able to control or obtain desirable structure or other characteristics.

As stated above, preferably, the blanket of the present invention contains non-woven fibers with aerogel, such as aerogel particles. Another way to describe the present invention is a blanket of non-woven fabric containing aerogel particles. Typically, the fabric is made from staple lengths of cotton, rayon, glass, or thermoplastic synthetic fibers which are mechanically positioned, preferably, in a random manner. The fibers can be bonded with an adhesive, such as synthetic adhesive or rubber latex. One or more sheets of the non-woven fabric can be formed and can be pressed together along with the aerogel particles to form mats. Generally, permanent bonds are formed when the fibers touch each other as a result of heat treatment, especially when the fibers are thermoplastic, or permanent bonds can be achieved by use of a binder or adhesive such as a high-polymer binder. The non-woven fabric can be or can contain more than one type of fiber, such as a combination of two different polymers or glass and polymeric fibers.

The blanket of the present invention can optionally have, on at least one side, at least one covering layer to form a laminate in order to improve the properties of the surface, such as increasing its wear resistance, providing the surface with a vapor barrier, or protecting the surface from becoming soiled. Covering layers can also improve the mechanical stability of the articles made from the composite material. If covering layers are used on both surfaces, these may be the same or different. Suitable covering layers can be any of the materials known to the person skilled in the art. The covering layers may be non-porous and, thus, effective as a vapor barrier; examples are plastic films, metal foils or metallized plastic films that reflect heat radiation. Porous covering layers, which permit the ingress of air into the material can also be used. Examples of porous covering layers are porous films, papers, fabrics, and webs. The matrix material itself can also be used as a covering layer. Preferably, the covering layer is a polymeric film, such as a polyester, polyurethane, and the like, or a thin fiberglass mat or blanket. The covering layer(s) can be applied to the blankets by a variety of methods. In addition to the in situ methods already mentioned, these methods include the following:

1. Forming the blanket on a scrim and/or placing a scrim on the wet blanket followed by compression and drying. The scrim may be composed of a polymeric or a fiberglass mat.
2. Placement of a porous or non-porous thermoplastic film on the surface of the dried blanket followed by hot calendaring at temperatures sufficient to cause bonding of the covering layer(s) to the blanket. Bonding can be further facilitated by use of hot-melt adhesives.

Since the covering layer(s) is/are typically more thermally conductive than the aerogel containing matrix, the thickness of the covering layer(s) should be much smaller than that of the matrix. Preferably, the covering layer(s) have a thickness of about 0.04 mm or less, such as 0.005 mm to 0.04 mm.

In several embodiments of the present invention, the present invention relates to a panel structure having at least two layers of glass wherein the layers of glass are separated by a gap. The aerogel blanket or mat of the present invention at least partially fills or is located in this gap to provide numerous benefits including thermal insulation. The aerogel blanket or mat generally can have a U-factor of 0.35 or less and a solar heat gain coefficient of 0.4 or less. The visible transmittance (VT) can be 0.90 or less or 0.75 or less. Thus, in at least one embodiment of the present invention, the present invention relates to double-glazed windows or structures with glass as the inner and outer layers and the air gap in between being replaced at least in part with the aerogel blanket or mat of the present invention. The gap can be any conventional size such as from about 2 mm to about 10 mm or more. The size of the panel structure can be any conventional size, for instance, from 1 m or less to 5 m or more in length or in width or both. The layers of glass that are used can be clear glass, tinted glass, high-performance tinted glass, high-solar-gain low-E glass, or other variations. The panel structure can have three or more glazing layers, and one or more gaps can contain the aerogel blanket or mat of the present invention. The three or more or triple glazed panel structure can have layers of plastic or other polymer layers or fibers as one of the layers, such as the middle glazing layer.

With respect to the aerogel blanket or mat, more than one aerogel blanket or mat can be used in the gap to form multiple layers of aerogel blankets or mats or a single blanket or mat can be used. The aerogel blanket or mat thickness can be a thickness that is the same thickness as the gap or it can be smaller. In other words, the blanket or mat can fill in the entire gap or some space can be left for air or other gases, such as krypton gas or argon gas or other materials.

The use of the aerogel mat or blanket offers numerous advantages. For instance, if aerogel particles were simply poured into the gap between the two layers of glass, there are numerous problems created by this use of aerogel. First, the particulate aerogel is difficult to handle. Second, the aerogel particles are difficult to introduce in between two layers of glass during the manufacturing process. Also, when particulate aerogel is located between two layers of glass in a window structure, when the glass expands, the aerogel can be subjected to pressures which can break the aerogel particulates and therefore degrades the insulating value of the aerogel. The present invention overcomes these difficulties by using an aerogel blanket or mat which provides a stable carrier for the aerogel. Unlike particulate aerogel which would need to be entirely introduced into the gap and one would need to ensure that sufficient aerogel particulate is present to totally fill the gap top to bottom, the aerogel blanket or mat of the present invention provides a structure wherein the aerogel particulates are substantially uniformly distributed throughout the mat such that aerogel is present throughout the gap and is adequately suspended in the blanket or mat. Thus, the suspended aerogel, along with the fibers present in the blanket or mat, offer enough room and flexibility such that when the glass layers expand or contract, the aerogel present in the blanket or mat is not crushed and therefore is not subjected to breakage. In other words, there is sufficient room or "give" in the blanket or mat such that the aerogel does not break. In addition, the use of the blanket or mat offers an easy means to introduce the aerogel in between two layers of glass or other material during the manufacturing process. Also, there are no problems with the settling of aerogel since the aerogel is suspended in a blanket or mat.

In addition, the blanket or mat can be clamped with a combination of materials such as spacers, fastners and/or adhesives, or other materials or elements to add rigidity to the blanket or mat so that the blanket or mat does not bend once it is present in the gap between the layers of glass or other material.

In lieu of layers of glass, certainly it is within the embodiments of the present invention, to use other layers of material which are adequate substitutes for glass, such as polymers and the like.

For purposes of the embodiments of the present invention, the aerogel blanket or mat can be prepared in any fashion, including the methods described above relating to the use of an aqueous slurry. However, other means can be used to prepare the aerogel mat or blanket.

The blanket located between the two layers of glass or other material is then hermetically sealed with the two layers of glass to form an overall panel structure. The means to hermetically seal the structure are conventional and known to those skilled in the art. The panel structure of the present invention can be used for a variety of different windows and doors and other structures which require some light transmission. The framing of the structure can be with any conventional material, such as metal, wood, polymer, and the like. As with conventional window frames, the shape of the panel structure can be in any conventional window or door shape.

In general, the blanket of the present invention can be used for a variety of uses including insulation uses including applications requiring thermal insulation, such as at temperatures of 1000° C. to 1200° C. or higher. For instance, and merely as examples, the blanket of the present invention can be used as an insulating material for pipes, such as a double-casing pipe, insulation for aircraft and parts thereof, building insulation, aerospace insulation, automotive insulation, clothing insulation, footwear insulation, and the like. Essentially, the present invention can be used in the same manner as aerogel mats or where a plurality of aerogels are used.

In addition, with respect to the aerogel containing a wetting agent with or without fibers, the present invention can be used in construction materials, such as in cement, concrete, and foam, such as syntactic foams. Generally, conventional amounts of these materials can be used in these various applications. The aerogel can be present in amounts to achieve desired insulation properties.

The present invention will be further clarified by the following examples, which are intended to be purely exemplary of the present invention.

EXAMPLES

Example 1

The weights of given volumes of aerogel of two mean particle sizes were determined from which their bulk densities were evaluated. The particles were then either fully or partially (i.e., primarily the outer surface layers) wetted by vigorous overnight shaking with water containing Barlox 12i surfactant. Full and partial wetting were accomplished by addition to each part of aerogel 0.8 and 0.2 parts by weight of the wetting agent, respectively. The slurries were dried and the volumes of the resulting dry powders were determined. The bulk densities of the aerogel particles before and after wetting are summarized in Table 1. The data indicates that there is a considerable increase in bulk density when the particles are wetted with 0.8 parts of wetting agent. In contrast, when a reduced amount of wetting agent (0.2 parts) was employed, the particle bulk densities were only slightly larger than those of the initial samples. The result indicates that the density of the hydrophobic aerogel is recovered/restored when the slurries are substantially dried. Experimental work has shown that use of 0.1 parts by weight of Barlox 12i surfactant is sufficient to cause wetting of aerogel particles with mean sizes larger than about 30 μm. As such, with just small levels of wetting agent, full recovery of the hydrophobic characteristics of the aerogel particles can be expected on drying of the surface-wetted aerogel particles.

TABLE 1

Effect of Wetting Agent Level on Spring Back

| Aerogel Particle Size mm | Aerogel Bulk Density kg/m³ | Barlox 12i to Aerogel Weight Ratio | Aerogel Bulk Density After Wetting, kg/m³ |
|---|---|---|---|
| 1.0 | 61 | 0.8 | 290 |
| 0.06 | 88 | 0.8 | 130 |
| 1.0 | 63 | 0.2 | 66 |
| 0.06 | 85 | 0.2 | 95 |

Example 2

The surface layers of aerogel particles of two mean sizes were wetted with water containing Barlox 12i surfactant. The resulting slurries were then combined with an aqueous dispersion of Kosa type 105 bicomponent fibers (3 denier, 0.64 mm cut length, sheath melting temperature of 128° C.), and then vacuum filtered through a 0.203 by 0.203 m² (8-inch by 8-inch) funnel. Aerogel mean particle size and weights of aerogel, fiber, and Barlox 12i employed are listed in Table 2. The aerogel was dispersed in about 750 ml of water/Barlox 12i solution by shaking and then stirring until complete wetting took place (determined when no powder floated on the surface of the vigorously stirred slurry). The Kosa fibers were dispersed in about 1.5 liters of water by gentle stirring. These were then added to the aerogel slurry, stirred for about a minute and then filtered. To ensure minimal fiber/aerogel separation because of density differences, gentle stirring was continued during filtration until about 1.5 liters of filtrate was obtained, after which stirring was discontinued. The resulting mats were then dried overnight at 100° C.

TABLE 2

Blanket Compositions

| Composition Number | Aerogel Size μm | Aerogel Weight, g | *Barlox 12i g | Kosa Fiber g | **Weight % Fiber |
|---|---|---|---|---|---|
| 1 | 30 | 22 | 2.2 | 11 | 33.3 |
| 2 | 30 | 23.43 | 2.34 | 9.6 | 29.1 |
| 3 | 30 | 24.75 | 2.48 | 8.25 | 25.0 |
| 4 | 60 | 22 | 2.2 | 11 | 33.3 |
| 5 | 60 | 23.43 | 2.34 | 9.6 | 29.1 |
| 6 | 60 | 24.75 | 2.48 | 8.25 | 25.0 |

*Barlox 12i was received as a 30 wt % solution in water. The weights listed are those for the pure compound.
**Excluding Barlox 12i, which is volatilized at 140° C.

Several mats were made at each composition. Hot pressing the mats to a specific thickness at 140° C. for 15 minutes resulted in a considerable gain in strength. The tendency for the aerogel to fall out of the mat increases as its fiber content is reduced. Mats containing 33 wt % fiber were relatively dust-free.

The top and bottom sides of the dried mats were covered with 25 μm thick polyester films. The mats were then either hot-pressed at 140° C. for 15 minutes to differing thicknesses, or the same mat was hot-pressed to successively smaller thicknesses. A good bond was formed between the mat and the polyester films so that the mats became dust-free. The thermal conductivities of the mats were evaluated at a mean temperature of 12.5° C. using a Lasercomp Fox 200 heat flow instrument (0° C. cold side and 25° C. warm side). The bulk densities of the samples, together with their thermal conductivities, are listed in Table 3.

TABLE 3

Thermal Conductivities of "Blankets"

| Composition Number | Bulk Density, g/cc | Thermal Conductivity, mW/m ° K |
|---|---|---|
| 1 | 0.103 | 23.81 |
| 1 | 0.109 | 23.77 |
| 1 | 0.146 | 23.76 |
| 1 | 0.159 | 23.43 |
| 1 | 0.202 | 23.38 |
| 2 | 0.103 | 21.13 |
| 2 | 0.112 | 20.88 |
| 2 | 0.137 | 20.57 |
| 2 | 0.171 | 20.99 |
| 2 | 0.217 | 23.15 |
| 3 | 0.099 | 22.27 |
| 3 | 0.107 | 21.85 |
| 3 | 0.145 | 19.69 |
| 3 | 0.165 | 20.56 |
| 3 | 0.216 | 20.43 |
| 4 | 0.104 | 21.66 |
| 4 | 0.113 | 21.28 |
| 4 | 0.138 | 20.13 |
| 4 | 0.166 | 19.92 |
| 4 | 0.213 | 20.38 |
| 5 | 0.103 | 21.82 |
| 5 | 0.113 | 20.28 |
| 5 | 0.142 | 19.45 |
| 5 | 0.162 | 19.10 |
| 5 | 0.193 | 19.35 |
| 6 | 0.104 | 20.71 |
| 6 | 0.111 | 20.42 |
| 6 | 0.131 | 20.03 |
| 6 | 0.163 | 19.92 |
| 6 | 0.211 | 20.56 |

The data in the table indicates that for each composition there is an optimum blanket density for minimum thermal conductivity. Although there is some scatter in the data, at the same blanket density thermal conductivity decreases as the blanket aerogel content and mean aerogel particle size increase. However, the differences in performance between compositions containing 29 and 25 wt % fiber are small. The data suggests that, for the present fiber, an aerogel content of about 29 wt % presents a good compromise between dustiness and thermal conductivity.

Example 3

22.5 g of aerogel was vigorously shaken and then stirred with 400 ml of water containing 52.5 g of 30 wt % Barlox 12i wetting agent until a uniform slurry that did not separate on standing was formed. This slurry was added to a dispersion of 33.75 g of Johns Manville Q-fibers in 3 liters of water. The combined slurry was filtered on a 13-inch diameter Buchner. The resulting mat was then dried and then heated to 130° C. to remove the wetting agent. A 0.203 by 0.203 m² (8-inch by 8-inch) section was cut out of the mat for thermal conductivity evaluation. Additional mats having the same composition were formed and pressed to differing densities. The thermal conductivities of the various blankets and their densities are listed in Table 4. The thermal conductivities of these mats, regardless of mat density, are much larger than those listed in Table 3. Since the volume of the Q fibers to aerogel employed was not substantially larger than the volume of Kosa fiber to aerogel, the increased thermal conductivity is attributed to the effect increased density of fully wetted aerogel on drying.

TABLE 4

Thermal Conductivity of Blankets Containing Fully Wetted Aerogel

| Blanket Density, g/cc | Thermal Conductivity, mW/m ° K |
|---|---|
| 0.133 | 31.85 |
| 0.223 | 28.27 |
| 0.253 | 29.09 |

Example 4

Three separate slurries of Kosa type 105 fibers (3 denier, 4 mm cut length) and partially wetted aerogel of mean particle size of 65 μm were prepared using the following procedures:

1) 2.5 g of aerogel was dispersed in 250 ml of water containing 0.83 g of 30 wt % Barlox by vigorous shaking and subsequent stirring. The product was then combined with a slurry consisting of 2.5 g of the Kosa type 105 fiber in 500 ml of water that was formed by gentle stirring.

2) A second slurry having the composition of step #1 was prepared.

3) 24.75 g of aerogel was dispersed in 750 ml of water containing 8.25 g of 30 wt % Barlox by vigorous shaking and subsequent stirring. The product was then combined with a slurry consisting of 8.25 g of the Kosa type 255 fiber in 1.5 liters of water that was formed by gentle stirring.

Slurry #1 was mixed well and then vacuum filtered through a 0.203 by 0.203 m² (8-inch by 8-inch) funnel until a mat that was free of surface water was formed. Slurry #3 was mixed well and then filtered through the mat of slurry #1. Finally, well-mixed slurry #2 was filtered through the mat of slurry #3. Thus, a three-layered structure was formed. The mat was dried at 100° C. and then hot pressed at 140° C. to various densities. The resulting mats had good strengths. Their thermal conductivities at the various mat densities are listed in Table 5. It is expected that further optimization of the mat structure, such as by reducing the thickness of the bottom and top layers, increasing their aerogel contents, and increasing the aerogel content of the intermediate layer, would form blankets with even smaller thermal conductivities.

TABLE 5

Thermal Conductivities of Mats with a Sandwich Structure

| Blanket Density, g/cc | Thermal Conductivity, mW/m ° K |
|---|---|
| 0.107 | 21.82 |
| 0.124 | 21.06 |
| 0.129 | 21.18 |
| 0.133 | 21.20 |
| 0.206 | 20.83 |
| 0.332 | 27.04 |

Example 5

The mats were made as follows:

1) 22 g of aerogel with a mean particle size of 65 μm was dispersed in 750 ml of water containing 2 g of the Barlox dispersant (100% basis) by vigorous shaking and stirring. Separately, 22 g of Lauscha BO6F fiber (6 μm diameter) was dispersed in 3 liters of water by a dispersator. The fiberglass slurry was first gently stirred, and then stirring speed was progressively increased (to about 10,000 RPM) after about 30 minutes. The aerogel/glass fiber dispersions were then combined and gently stirred. The resulting slurry was filtered through a 0.203 by 0.203 m² (8-inch by 8-inch) funnel. Very rapid dewatering took place. The mat was dried overnight at 120° C., weighed and then hot-pressed to successively higher densities (determined from blanket weight and thickness). The thermal conductivities of the mats were determined at each density.

2) Experiment 1 was repeated, except that the fiber dispersion consisted of the Lauscha B26R glass fibers.

3) Experiment 1 was repeated, except that the fiber dispersion consisted of 20 g of Lauscha BO6F fibers and 2 g of Minifibers EST8 polyethylene fibers. The polyethylene fibers were first dispersed by means of a Warring Blender in about 300 ml of water before being added to the glass fibers.

4) Experiment 1 was repeated, except that the aerogel was replaced by an aerogel having a mean particle size of 1 mm.

The densities, thermal conductivities, and some characteristics of the mats are summarized in Table 6.

TABLE 6

Properties of Aerogel/Fiber Glass Mats

| Experiment # | Thickness cm | Density g/cc | Conductivity, mW/m ° K | Comments |
|---|---|---|---|---|
| 1 | 1.653 | 0.062 | 25.18 | a |
|   | 1.409 | 0.073 | 24.40 |   |
|   | 1.206 | 0.085 | 23.73 |   |
|   | 0.908 | 0.113 | 22.63 |   |
| 2 | 1.859 | 0.060 | 26.19 | b |
|   | 1.559 | 0.072 | 25.08 |   |
| 3 | 1.884 | 0.055 | 25.89 | c |
|   | 1.493 | 0.069 | 24.68 |   |
|   | 1.300 | 0.079 | 24.03 |   |
|   | 0.916 | 0.112 | 22.83 |   |
|   | 0.645 | 0.160 | 22.41 |   |
|   | 0.302 | 0.328 | 26.63 |   |
| 4 | 2.011 | 0.053 | 26.30 | d |
|   | 1.531 | 0.069 | 24.95 |   | a Mats are reasonably strong and only slightly dusty.
b Mats are much weaker and dustier than the mats of Experiment 1. This is attributed to the use of larger diameter glass fibers than in Experiment 1.
c Mats are stronger and less prone to dustiness than the Mats of Experiment 1. This is attributed to the polyethylene (on heating above its melting point) serving as a binder for the glass fibers.
d Mats contain a large/high quantity of loose aerogel. This experiment indicates that there is an optimum aerogel size for minimizing dustiness.

Example 6

Three separate slurries of Lauscha BO6F glass fibers and partially wetted aerogel of mean particle size of 65 μm were prepared using the following procedures:

1) 2.5 g of aerogel was dispersed in 250 ml of water containing 0.83 g of 30 wt % Barlox by vigorous shaking and subsequent stirring. The product was then combined (by stirring) with a slurry of 3 g of the Lauscha BO6F fibers dispersed by dispersator in 500 ml of water.

2) A second slurry having the composition of step #1 was prepared.

3) 9 g of aerogel was dispersed in 750 ml of water containing 3 g of 30 wt % Barlox by vigorous shaking and subsequent stirring. This was then combined (by stirring) with a slurry consisting of 6 g of Lauscha BO6F fibers in 1.5 liters of water dispersed by dispersator.

Slurry #1 was mixed well and then vacuum filtered through a 0.203 by 0.203 m² (8-inch by 8-inch) funnel until a mat that was free of surface water was formed. Slurry #3 was mixed well and then filtered through the mat of slurry #1. Finally, the well mixed slurry #2 was filtered through the mat of slurry #3. Thus, a three-layered structure was formed. The wet mat was compacted to a thickness of 0.635 cm (¼") and dried at 125° C. Its thermal conductivity was evaluated and then hot-pressed at 140° C. to various densities. The resulting mats had good strengths and were essentially dust-free.

Example 7

Three separate slurries of Lauscha BO6F glass fibers, polyethylene, and partially wetted aerogel of mean particle size of 65 μm were prepared using the following procedures:

1) 2.5 g of aerogel was dispersed in 250 ml of water containing 0.83 g of 30 wt % Barlox by vigorous shaking and subsequent stirring. The product was then combined (by stirring) with a slurry of 1 g polyethylene, which was initially dispersed in a Warring Blender, and then added to 2 g of the Lauscha BO6F fibers and subsequently dispersed by dispersator in 500 ml of water 2) A second slurry having the composition of slurry #1 was prepared.

3) 9 g of aerogel was dispersed in 750 ml of water containing 3 g of 30 wt % Barlox by vigorous shaking and subsequent stirring. The product was then combined (by stirring) with a slurry consisting of 6 g of Lauscha BO6F fibers in 1.5 liters of water dispersed by dispersator.

Slurry #1 was mixed well and then vacuum filtered through a 0.203 by 0.203 m² (8-inch by 8-inch) funnel until a mat that was free of surface water was formed. Slurry #3 was mixed well and then filtered through the mat of slurry #1. Finally, the well mixed slurry #2 was filtered through the mat of slurry #3. Thus, a three-layered structure was formed. The wet mat was compacted to a thickness of 0.635 cm (¼") and dried at 125° C. Its thermal conductivity was evaluated and then hot-pressed at 140° C. to various densities. The resulting mats had good strengths and were essentially dust-free. The mats of Experiment 7 were somewhat stronger than those of Experiment 6. The mat thicknesses, densities, and thermal conductivities are summarized in Table 8.

TABLE 8

Characteristics of Multi-ply Mats

| Experiment # | Treatment | Thickness cm | Density g/cc | Conductivity mW/m ° K |
|---|---|---|---|---|
| 6 | Compacted | 0.835 | 0.077 | 24.25 |
|   | Hot Pressed | 0.787 | 0.082 | 23.71 |
| 7 | Compacted | 0.949 | 0.063 | 25.10 |
|   | Hot Pressed | 0.759 | 0.083 | 23.78 |

It is expected that further optimization of the mat structure, such as by reducing the thickness of the bottom and top layers, increasing their aerogel contents, and increasing the aerogel content of the intermediate layer, would form blankets with even smaller thermal conductivities at given overall blanket densities.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. Hydrophobic aerogels coated with at least one wetting agent contained in water, wherein said at least one wetting agent is present in an amount of from about 0.05 to about 0.5 parts by wt. per each part by wt. of said aerogels, said hydrophobic aerogels have an average particle diameter of from about 0.03 mm to about 1 mm, and said at least one wetting agent is selected from the group consisting of alkyldimethyl amine oxides, alkoxylates polyoxyalkylene fatty ethers, sorbitan esters, mono and diglycerides, polyoxyethylene sorbitol esters, Hypermen polymer surfactants, sodium coco-PG-dimonium chloride phosphate, coamidopropyl PG-dimonium chloride phosphate, phosphate esters, polyoxyethylene fatty acid esters, nonionic esters formed by reaction of ethylene oxide and unsaturated fatty acids and heterocyclic resin acids, alcohol ethoxylates, alcohol alkoxylates, ethylene oxide/propylene oxide block copolymers, and polyoxyethylene derivatives of sorbitan esters, or combinations thereof.

2. The hydrophobic aerogels of claim 1, wherein said wetting agent is present in an amount of from about 0.05 to about 0.4 parts by wt. per each part by wt. of said aerogel.

3. The hydrophobic aerogels of claim 1, wherein said at least one wetting agent comprises at least one surface active agent, at least one dispersant, or a combination thereof.

4. The hydrophobic aerogels of claim 1, wherein said at least one wetting agent comprises sodium di-2-ethylhexyl-sulfosuccinite, a branched alkyldimethylamine oxide, an octylphenoxypolyethoxy (9-10) ethanol, or combinations thereof.

5. The hydrophobic aerogels of claim 1, wherein said at least one wetting agent is a nonionic surfactant.

6. The hydrophobic aerogels of claim 1, wherein said hydrophobic aerogel consists essentially of $SiO_2$ aerogel.

7. The hydrophobic aerogels of claim 1, wherein said hydrophobic aerogels have a particle diameter of from about 0.05 mm to about 0.5 mm, a porosity greater than about 60%, density less than about 0.4 g/cc, and a thermal conductivity less than about 40 mW/m°K.

8. The hydrophobic aerogels of claim 1, wherein said at least one wetting agent is present in an amount sufficient for the hydrophobic aerogels to have a thermal conductivity of from about 10 to about 30 mW/m°K.

9. The hydrophobic aerogels of claim 1, wherein said at least one wetting agent is present in an amount sufficient for the hydrophobic aerogels to have a thermal conductivity of from about 12 to about 25 mW/m°K.

10. The hydrophobic aerogels of claim 1, wherein said at least one wetting agent is branched alkyldimethylamine oxide present in an amount of from about 0.05 to about 0.4 parts by wt. per each part by wt. of said aerogel.

11. The hydrophobic aerogels of claim 1, wherein the hydrophobic aerogels comprise trimethylsilyl groups, dimethylsilyl groups, or both, for permanent hydrophobization.

* * * * *

UNITED STATES PATENT AND TRADEMARK OFFICE
CERTIFICATE OF CORRECTION

PATENT NO. : 7,635,411 B2  Page 1 of 1
APPLICATION NO. : 11/013306
DATED : December 22, 2009
INVENTOR(S) : Rouanet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this

Ninth Day of November, 2010

David J. Kappos
*Director of the United States Patent and Trademark Office*